Oct. 17, 1950

C. C. SCHWEISO ET AL 2,526,050

SAFETY LATCH FOR PRESSURE COOKERS

Filed May 3, 1948

INVENTORS
CLIFFORD C. SCHWEISO
JOHN N. POLIVKA

BY William C. Babcock
ATTY.

Oct. 17, 1950     C. C. SCHWEISO ET AL     2,526,050
SAFETY LATCH FOR PRESSURE COOKERS
Filed May 3, 1948     3 Sheets-Sheet 2
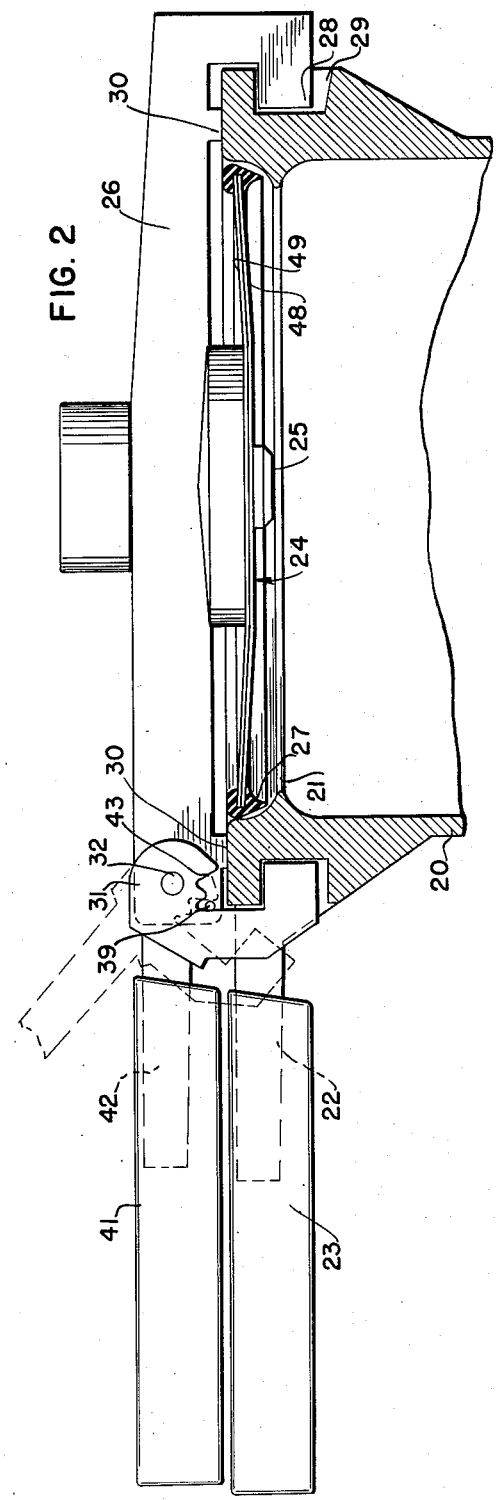
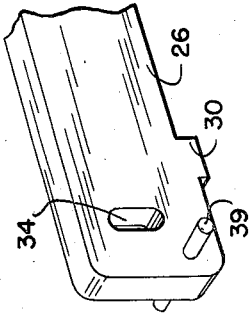
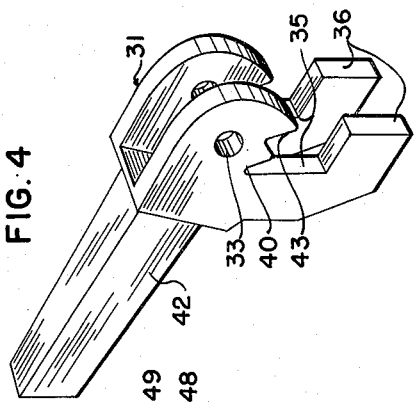
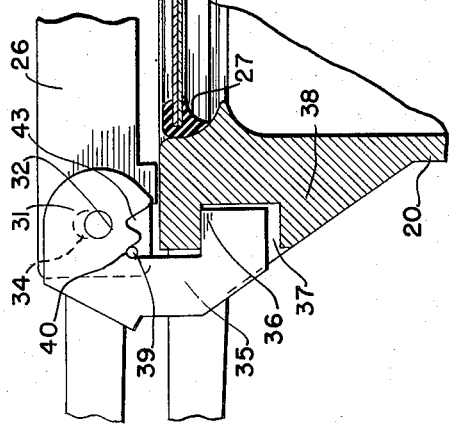
INVENTORS
CLIFFORD C. SCHWEISO
JOHN N. POLIVKA
BY *William C. Babcock*
ATTY Oct. 17, 1950     C. C. SCHWEISO ET AL     2,526,050
SAFETY LATCH FOR PRESSURE COOKERS
Filed May 3, 1948     3 Sheets-Sheet 3
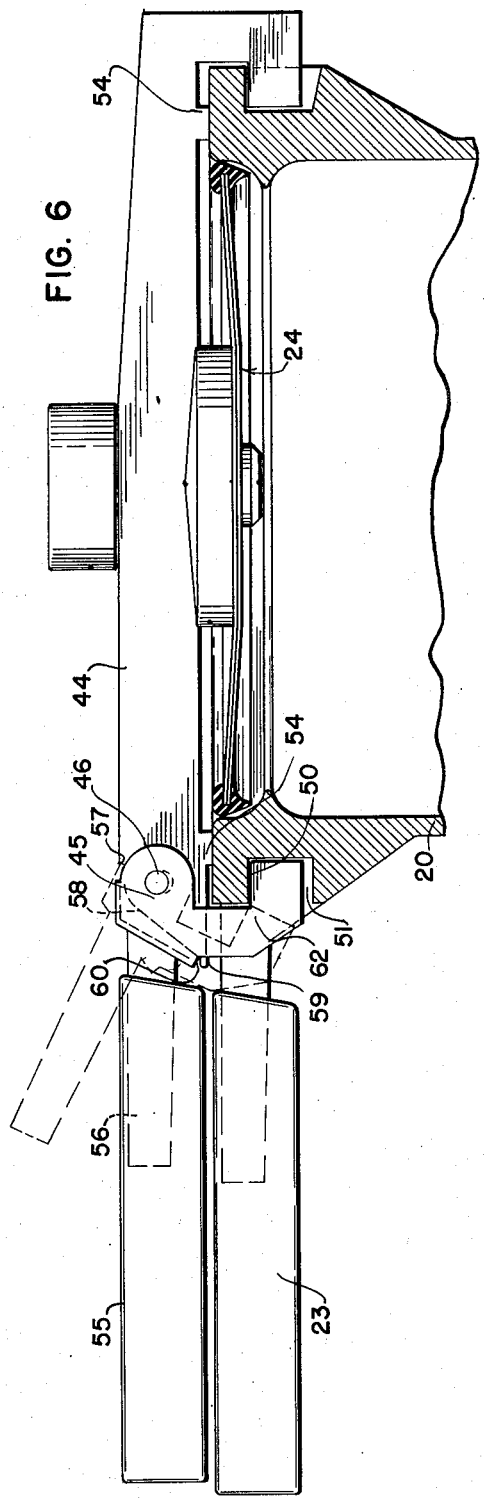
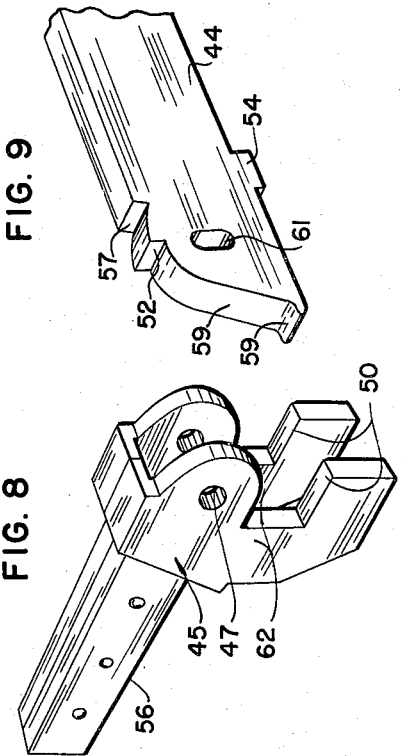
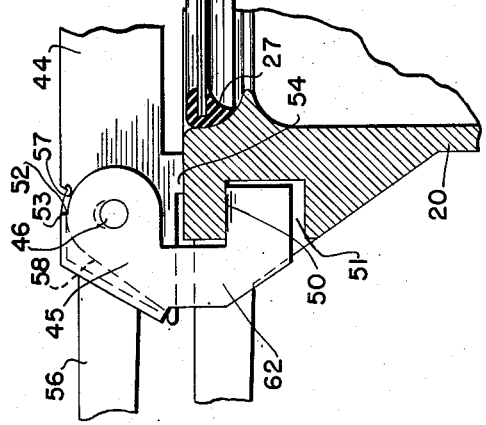
INVENTORS
CLIFFORD C. SCHWEISO
JOHN N. POLIVKA
BY William C. Babcock
ATTY.

Patented Oct. 17, 1950

2,526,050

UNITED STATES PATENT OFFICE 2,526,050

SAFETY LATCH FOR PRESSURE COOKERS

Clifford C. Schweiso and John N. Polivka, Minneapolis, Minn., assignors to General Mills, Inc., a corporation of Delaware Application May 3, 1948, Serial No. 24,766

10 Claims. (Cl. 220—56)

This invention pertains to pressure cookers and more specifically to an improved safety mechanism for preventing the removal of the cover from such a cooker while there is still steam pressure within the pot. This application is a continuation in part of our application, now abandoned, Serial No. 715,832, filed December 12, 1946, for Safety Latch for Pressure Cooker.

Various methods have been proposed in the prior art for preventing removal of pressure cooker covers until the steam pressure has been relieved. One such method is shown in the copending application of Clifford Schweiso, Serial No. 24,764, filed May 3, 1948, for Safety Mechanism for Pressure Cookers, and assigned to the same assignee as the present invention.

It is an object of this invention to provide improved fastening means for a pressure cooker in which the fastening means cannot be operated while there is internal pressure within the cooker.

Another object is to provide positive locking means for preventing removal of a cooker cover until the pressure has been relieved.

Still another object is the provision of a cooker construction in which a cover supporting member is fastened to the cooker body by a pivoted latch having a loose connection to permit limited outward movement of the supporting member and at least a portion of the cover in response to predetermined changes in the pressure and/or temperature inside the cooker.

A further object of the invention is the provision of such a latch and loose connection with positive interengaging locking means to prevent operation of the latch while such a cover supporting member is held outwardly from the cooker body.

Other objects and advantages of the present invention will be apparent from the following description:

The above objects are accomplished by making a pressure cooker in the form shown in the attached drawings forming a part of this specification and in which:

Fig. 2 is a partial sectional view showing the cooker of Fig. 1 in its unsealed and unlocked position;

Fig. 3 is a view similar to Fig. 2 but with the cooker in its sealed and locked position;

Fig. 4 is an enlarged perspective view of one form of latch for such a cooker;

Fig. 5 is an enlarged perspective view of part of the cover supporting member of the cooker of Fig. 1;

Fig. 6 is a partial sectional view of another embodiment of the present invention with the cooker and latch unsealed and unlocked;

Fig. 7 is a view similar to Fig. 6 but with the cooker in its sealed and locked position;

Fig. 8 is an enlarged perspective view of the latch member shown in Figs. 6 and 7; and Fig. 9 is an enlarged perspective view of the end of the cover supporting member shown in Figs. 6 and 7.

Figure 1:
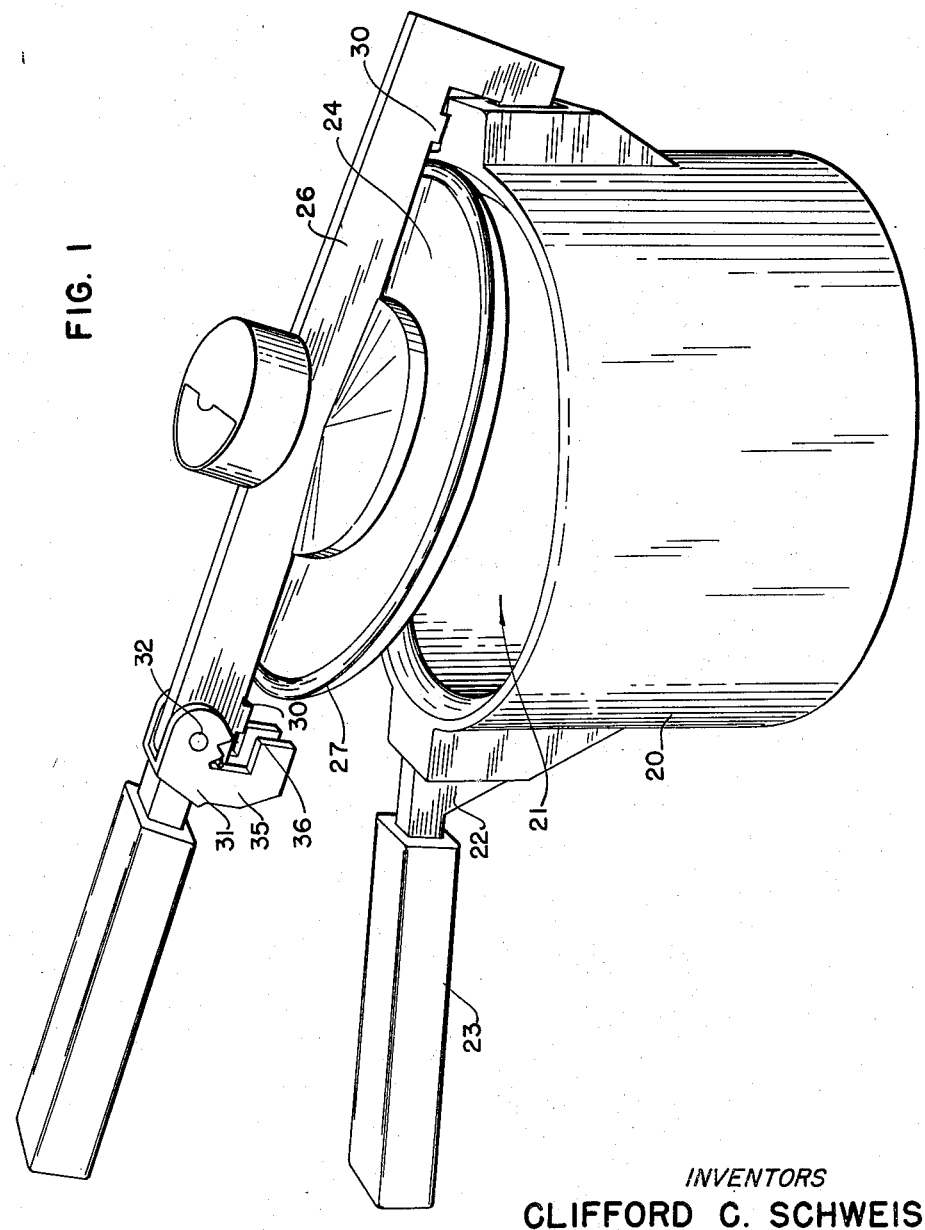
Figure 1 is a perspective view of a pressure cooker made according to one embodiment of the invention.

With reference to the drawings, wherein like reference characters indicate like parts, we have shown in Fig. 1 a pressure cooker which includes a main body member or pot 20 provided with a suitable opening 21 in its top. A handle extension 22 is provided at one side of the pot and a handgrip portion 23 of plastic or other heat-insulating material is fastened thereto.

A cover 24 is fastened at its center (as at 25 in Fig. 2) to a suitable cover supporting member or crossbar 26 which extends substantially diametrically across the opening of the body member 20. This cover may be of any desired construction in which at least a portion of the cover is adapted to flex outwardly in response to the temperature or pressure, or both, within the pot 20. By way of example, we have shown a bi-metallic cover constructed of two layers of metal 48 and 49 which have different coefficients of thermal expansion. Thus, layer 48 may be made of Invar steel and layer 49 of brass, with the brass layer on top of the steel layer and firmly fastened thereto throughout its area as by welding, riveting, or other known methods for the manufacture of compound metal stock. In lieu of brass, a layer of stainless steel having a relatively high coefficient of thermal expansion may be used. It is apparent that an increase in temperature within the pot will cause expansion of the cover and will cause the edges thereof to flex downwardly toward the annular seat constituting the opening in the cooker body 20 as shown in Fig. 3. Similarly, a reduction in temperature will cause a reverse flexing of the cover edges to the unsealed position as shown in Fig. 2.

A suitable gasket 27 is carried by the edge of the cover and, as shown in Figs. 2 and 3, is adapted to form a pressure-tight seal with the edges of the cooker body opening, when the temperature has risen to the desired cooking range. This seal, when once established, is strengthened by internal pressure against the thin downward lip of the gasket 27. Further increase of temperature beyond this point will result in upward movement of the center of the cover and will thus tend to force the supporting member or crossbar 26 outwardly away from the body member.

In order to fasten the cover and supporting member to the cooker body, we have provided at one end of the crossbar a hook 28 adapted to engage a recess 29 in the cooker body. Lugs 30 at the ends of the crossbar immediately adjacent the edges of the opening 21 serve to support the bar and cover on the top of the cooker body as shown in Fig. 2 when the cover is first put in position prior to sealing.

At the opposite end of the crossbar from hook 28 is provided a pivoted latch member 31 which is connected to the crossbar by a pin 32 rigidly carried in holes 33 of the latch (see Fig. 4) and rotatably and slidably movable in a slot 34 of the crossbar (see Fig. 5). This slot is substantially perpendicular to the plane of cover 24.

Latch 31 includes two downwardly projecting hooks 35, the tips 36 of which are engageable in recesses 37 formed in the thickened portion 38 of the cooker body.

The improved locking means, according to this embodiment of the invention, includes, in addition to the above pin and slot connection, a pin 39 projecting from the end of the crossbar 26 relatively near slot 34, and a locking notch 40 formed in the latch 31. As will be seen from the drawings, the pin and slot connection permits limited vertical or outward movement of crossbar 26 from the cooker body without change in the position of latch 31. As the bar moves outwardly from the position of Fig. 2 to the position of Fig. 3, this locking pin 39 slips into the locking notch 40 and makes it impossible to rotate latch 31 with respect to the crossbar as long as the crossbar remains in its outward or displaced position. However, as soon as the pressure and temperature decrease within the pot, the cover 24 will move to the unsealed position of Fig. 2 and will permit the crossbar 26 to drop back toward the cooker body so that it rests upon the supporting lugs 30. In this position, the operator can grasp handle 41 which is fastened on a projection 42 of latch 31 and can lift the latch so that locking notch 40 is disengaged from pin 39. It will then be possible to raise the outer end of handle 41 and rotate the latch 31 to the dotted line position of Fig. 2, so that the locking hooks 36 are disengaged from the recess 37. In this position, the cover and cover supporting member can be easily removed from the body portion 20. Rotary movement of handle 41 and latch 31 in a clockwise direction is limited by the shoulder 43 on the latch so that during the first part of the rotation of latch 31 the locking hooks will be disengaged from recesses 37 after which further lifting and rotation of handle 41 and latch 31 will enable the user to raise the crossbar and cover. Shoulder 43 is long enough to act as a stop no matter whether pin 32 is at the bottom or top of slot 34. Counter-clockwise rotation of the handle and latch is limited by engagement of notch 40 or the adjacent portion of hooks 35 against pin 39. Thus, if the cover is detached from the pot and the handle is held horizontally, the cover and crossbar will not drop downwardly but will also be held in a horizontal position.

It will be apparent from the foregoing description that we have provided a positive locking means for latch 31 which absolutely prevents the user from rotating the latch to its open position as long as the crossbar 26 is held in its outwardly displaced position, due to flexing of the cover in response to temperature or pressure.

With reference to Figs. 6 to 9, we have shown another embodiment of the present invention in which the locking means is of somewhat different form. As shown in Fig. 6, a crossbar 44 carries a pivoted latch 45 which is fastened by pin 46 to the crossbar. Pin 46 is held firmly in holes 47 in the latch and passes through the elongated vertical slot 61 in the crossbar. This construction permits limited movement of the crossbar and latch toward and away from the cooker, just as in the embodiment of Figs. 1 to 5. Latch 45 has two downwardly projecting arms 62 provided with hooks 50 which engage the recess 51 in the cooker body in the same manner as the hooks shown in the preceding figures.

In this embodiment of the invention, the positive locking means which prevents rotation of the latch from its closed to its open position includes a vertical abutment 52 (see Figs. 7 and 9) at the upper edge of crossbar 44. This abutment 52 is substantially in line with slot 61 as is clearly shown in the drawing. Latch 45 is provided with a corresponding shoulder 53 (Figs. 7 and 8) positioned above the holes 47 which carry pin 46. It will be apparent from the drawings that abutment 52 and shoulder 53 lie substantially parallel and in the same plane when latch 45 is in its closed position. Outward movement of crossbar 44, due to internal pressure and temperature, will cause abutment 52 to slide outwardly directly into the bend of shoulder 53 as shown in Fig. 7. Thus, it will be impossible to rotate latch 45 to its open position as long as crossbar 44 is held in this outward position. However, upon cooling of the cooker and contents, and relief of the internal pressure, crossbar 44 will drop back toward the cooker body so that supporting lugs 54 rest on the cooker body, as in Fig. 6. In this position, just as in the previous case, it will be a simple matter to lift the handle 55, which is fastened to the handle extension 56 of latch 45. As the handle is lifted, the latch 45 will also be raised, and the pin and slot connection will permit relative movement between the latch and crossbar so that shoulder 53 slides upwardly past the abutment 52 and is no longer blocked by said abutment. The user can then raise the outer end of the handle and thus rotate latch 45 until shoulder 53 engages stop 57 on the crossbar to limit further rotation, as shown by the dotted line position of Fig. 6. During this rotation, the latch hooks 50 will be disengaged from locking recesses 51. Further lifting of handle 55 will raise the supporting member 44 and cover 24 away from the cooker body so that the user will have ready access to the contents of the cooker.

Stop 57 limits rotation of latch 45 in one direction (clockwise in Figs. 6 and 7). Additional stop means must be provided to limit rotation of latch 45 in the opposite direction (counterclockwise in Figs. 6 and 7). For this purpose, we have provided the limiting surface 58 and lug 59 on the end of crossbar 44. As best shown in Fig. 7, lug 59 projects into the path of horizontal shoulder 60 on latch 45. Lug 59 is long enough to limit counterclockwise rotation of the latch in either relative position of the crossbar and latch, i. e., whether pin 46 is in the outer or inner end of slot 61. With pin 46 in the lower or inner end of the slot (as in Fig. 7) shoulder 60 will engage the outer portion of lug 59. With pin 46 in the upper or outer end of slot 61, shoulder 60 will engage the inner portion of lug 59 at the bend where it joins limiting surface 58. Thus, when the cover is removed from the cooker body 20, and the handle 55 is held horizontally by the user, lug 59 and shoulder 60 will engage each other to support crossbar 44 and cover 24 also in a horizontal position.

The latch member, as shown in Fig. 8, is made of two halves riveted together, while the latch member of Fig. 4 is shown as a single integral unit. The exact method of construction is a matter of choice and is determined solely by practical considerations of availability of materials and economy of construction.

While we have shown only two specific interengaging locking connections between the pivoted latch and the cover supporting member, according to the invention, it will be readily apparent that those skilled in the art can make minor changes and provide equivalent positive locking means for a pressure and/or temperature-responsive pressure cooker cover without departing from the essential spirit and scope of this disclosure. It is, therefore, apparent that the invention is not to be restricted to the specific locking means shown but only by the scope of the attached claims.

Now, therefore, we claim:

1. In a pressure cooker having a body member provided with an opening, a cover for said opening, and a supporting member carrying said cover, the combination of fastening means removably attaching said supporting member to said body member and including a latch pivoted to one of said members by a loose connection for swinging movement between open and closed positions, said loose connection permitting limited outward movement of said supporting member when said latch is in closed position, and interengaging means on said latch and said one member positively locking said latch in closed position when said supporting member is moved outwardly.

2. In a pressure cooker having a body member provided with an opening, a cover for said opening, and a supporting member carrying said cover, the combination of fastening means removably attaching said supporting member to said body member and including a latch pivoted to said supporting member by a loose connection for swinging movement between open and closed positions, said loose connection permitting limited outward movement of said supporting member when said latch is in closed position, and interengaging means on said latch and supporting member positively locking said latch in closed position when said supporting member is moved outwardly.

3. In a pressure cooker having a body member provided with an opening, a cover for said opening, and a supporting member carrying said cover, the combination of fastening means removably attaching said supporting member to said body member and including a latch pivoted to said supporting member by a loose connection for swinging movement between open and closed positions, said loose connection permitting limited outward movement of said supporting member when said latch is in closed position, and interengaging means on said latch and supporting member positively locking said latch in closed position when said supporting member is moved outwardly, said interengaging means consisting of an abutment on said supporting member and a shoulder on said latch engaging said abutment only while said supporting member is moved outwardly from the body and latch.

4. In a pressure cooker having a body member provided with an opening, a cover for said opening, a supporting member carrying said cover and removably attached to said body, the combination of a latch pivoted to said supporting member by a loose connection for swinging movement between open and closed positions, said loose connection permitting limited outward movement of said supporting member when said latch is in closed position, and interengaging means on said latch and supporting member positively locking said latch in closed position when said supporting member is moved outwardly, said interengaging means consisting of an abutment on said supporting member substantially in line with said loose connection in the direction of limited movement of said supporting member, and a shoulder on said latch positioned in the plane of said abutment when the latch is in closed position and engaging said abutment only while said supporting member is moved outwardly from the body.

5. In a pressure cooker having a body member provided with an opening, a cover for said opening, a supporting member carrying said cover and fastening means removably attaching said supporting member to said body, the combination of a latch pivoted to said supporting member by a loose connection for swinging movement between open and closed positions, said loose connection permitting limited outward movement of said supporting member when said latch is in closed position, and interengaging means on said latch and supporting member positively locking said latch in closed position when said supporting member is moved outwardly, said interengaging means consisting of a pin on said supporting member and a locking notch on said latch, said pin engaging said notch only when said latch in closed position and said supporting member is moved outwardly.

6. In a pressure cooker having a body member provided with an opening, the combination of a supporting member, a cover for said opening carried by said supporting member and having a portion moving said supporting member away from the opening in response to a predetermined change in a condition selected from the group consisting of pressure and temperature within said cooker, and fastening means removably attaching said supporting member to said body member and including a latch pivoted to one of said members by a loose connection for swinging movement between an open position permitting removal of said supporting member and cover and a closed position preventing such removal, said loose connection permitting limited outward movement of said supporting member while said latch is in closed position, and interengaging means on said latch and said one member positively locking said latch in closed position when said supporting member is moved outwardly by said cover portion.

7. In a pressure cooker having a body member provided with an opening and a cover for said opening, the combination of a supporting member carrying said cover and movable outwardly from said opening in response to a predetermined change in a cooking condition selected from the group consisting of pressure and temperature within said cooker, and fastening means removably attaching said supporting member to said body member, said fastening means including a latch pivoted to said supporting member by a loose connection for swinging movement between an open cover-removing position and a closed, cover-retaining position, said loose connection permitting limited outward movement of said supporting member in response to said cooking condition, and interengaging means on said latch and supporting member positively locking said latch in closed position when said supporting member is moved outwardly.

8. In a pressure cooker having a body member provided with an opening and a cover for said opening, the combination of a supporting member carrying said cover and movable outwardly from said opening in response to a predetermined change in a cooking condition selected from the group consisting of pressure and temperature within said cooker, and fastening means removably attaching said supporting member to said body member, said fastening means including a latch pivoted to said supporting member by a pin and slot connection for swinging movement between an open cover-removing position and a closed, cover-retaining position, said pin and slot connection permitting limited outward movement of said supporting member in response to said cooking condition, and interengaging means on said latch and supporting member positively locking said latch in closed position when said supporting member is moved outwardly.

9. A pressure cooker having a body member provided with an opening, a cover member for said opening, fastening means removably attaching the cover member to the body member and including a latch mounted on one of said members by a loose connection for movement between open and closed positions, the loose connection also permitting limited outward movement of the cover member while the latch remains in closed position, and interengaging means on the latch and said one member positively locking the latch in closed position when the cover member is moved outwardly.

10. A pressure cooker having a body member provided with an opening, a cover member for said opening, fastening means removably attaching the cover member to the body member and including a latch mounted on one of said members by a connection permitting movement of the latch in one direction between open and closed positions and also permitting limited movement between the latch and said one member in another direction to accommodate slight outward movement of the cover member while the latch remains in closed position, and interengaging means on the latch and said one member positively locking the latch in closed position when the cover member is moved outwardly.

CLIFFORD C. SCHWEISO.
JOHN N. POLIVKA.

REFERENCES CITED

The following references are of record in the file of this patent:

UNITED STATES PATENTS

| Number | Name | Date |
|---|---|---|
| 1,106,837 | Pfoehler et al. | Aug. 11, 1914 |
| 1,439,000 | Jacobs | Dec. 19, 1922 |
| 2,324,356 | Brown | July 13, 1943 |
| 2,387,360 | Smith | Oct. 23, 1945 |